Patented Jan. 5, 1932

1,840,287

UNITED STATES PATENT OFFICE

FRITZ HOFMANN AND CARL WULFF, OF BRESLAU, GERMANY, ASSIGNORS, BY MESNE ASSIGNMENTS, TO STANDARD-I. G. COMPANY, OF LINDEN, NEW JERSEY, A CORPORATION OF DELAWARE

EXTRACTION OF OILS FROM MATERIALS CONTAINING SAME

No Drawing. Application filed January 4, 1928, Serial No. 244,552, and in Germany January 4, 1927.

This invention relates to the extraction of oils from the products and residues obtained by destructive hydrogenation of carbonaceous materials and from the distillation residues of the products of such destructive hydrogenations.

We have found that oils contained in mixtures with solid coaly materials with or without mineral matter obtained by the destructive hydrogenation of carbonaceous materials, such as varieties of coal, tars, mineral oils, and the like, or in the distillation residues of products of such destructive hydrogenation, are practically completely extracted from said mixtures by acting thereon with liquid sulfur dioxid. By the said treatment oils in a fluid state are extracted as well as such constituents as become fluid only by heating. The sulfur dioxid may be applied as such or in mixture with any other suitable solvent, such as benzene or the like.

The treatment of the oil containing material can be performed at any suitable temperatures and also under ordinary or elevated pressure, the most favorable conditions depending on the nature of the initial materials. When the material to be treated is in a practically dry state it is advantageously reduced to small pieces in order to procure enlarged surfaces.

The solvent can be repeatedly used and thereby may sometimes be enriched in constituents of the material to be treated which impart to it a still higher dissolving power. By the process of the present invention excellent yields of most valuable products are obtained at low cost and even from material hitherto regarded as nearly valueless in view of the difficulties in extracting the oils contained therein and of its low content in oil.

The nature of this invention will be further illustrated by the following examples but the invention is not restricted thereto.

Example 1

500 parts of a residue from the destructive hydrogenation of coal with a freezing point of 50° centigrade are crushed and then treated in the mixing vessel of an Edeleanu apparatus for refining mineral oils provided at the bottom with a filtering system with liquid sulfur dioxid. After filtering off the liquid mixture and evaporating the sulfur dioxid, about 260 parts of a viscous oil are obtained and on the filter remains a black pulverulent mass which yields no appreciable amounts of oil even when treated with benzene for a long time.

Example 2

A product from the destructive hydrogenation of coal containing 60 per cent of oils in admixture with solid materials is treated with sulfur dioxid at about 80° centigrade and under a pressure of 20 atmospheres. The liquid products are obtained in a nearly quantitative yield and in the form of a viscous oil.

What we claim is:

1. The process for the extraction of oils from a product of destructive hydrogenation of coal containing about 60 per cent of oil in admixture with solid materials, which comprises treating the said product with liquid sulfur dioxid at about 80° C. and under a pressure of 20 atmospheres.

2. A process for the extraction of oils from the products consisting of mixtures of oil with solids obtained as residues in the destructive hydrogenation of carbonaceous materials when the low-boiling hydrocarbons have been distilled off, which comprises treating the said product with liquid sulphur dioxid at about 80° C. and under a pressure of 20 atmospheres.

In testimony whereof, we have hereunto set our hands.

FRITZ HOFMANN.
DR. CARL WULFF.